United States Patent
Imai et al.

[15] 3,669,845

[45] June 13, 1972

[54] METHOD FOR THE PREPARATION OF PENTITOL FROM PENTOSE BY USING BACTERIA

[72] Inventors: Tomio Imai, Tokyo; Mutsuo Shimamura, Saitama; Juichi Yoshitake, Saitama; Hitoshi Ohiwa, Saitama, all of Japan

[73] Assignee: Godo Shusei Kabushiki Kaisha, Tokyo, Japan

[22] Filed: July 9, 1969

[21] Appl. No.: 840,158

[30] Foreign Application Priority Data

March 4, 1969 Japan..................................44/15860

[52] U.S. Cl..............................................195/43
[51] Int. Cl. .....................................C12d 13/00
[58] Field of Search............................195/32, 37, 42, 43, 49

[56] References Cited

OTHER PUBLICATIONS

Misawa et al., " Bacterial Accumulation of Ribulose and Xylulose," Agr. Biol. Chem., Vol. 31, pp. 611–615, 1967.

Onishi et al., " Production of Xylitol, Arabinitol, and Ribitol by Yeasts," Agr. Biol. Chem., Vol. 30, pp. 1,139– 1,144, 1966.

*Primary Examiner*—A. Louis Monacell
*Assistant Examiner*—Gary M. Nath
*Attorney*—Wenderoth, Lind & Ponack

[57] ABSTRACT

Method for the preparation of xylitol, ribitol and anobitol by converting xylose, ribose and arabinose into the pentitol by the action of a strain of Corynebacterium, No. 208 or variation of said strain or strains belonging to Corynebacterium on a culture medium comprising a carbon source, a nitrogen source, inorganic salts and thiamine or a thiamine-containing source. The pentose is added to the culture medium at an optimal point of time during cultivation thereby to convert the pentose into the pentitol and permit recovery of said pentitol.

6 Claims, 3 Drawing Figures

INFRARED ABSORPTION SPECTRUM (XYLITOL)

INFRARED ABSORPTION SPECTRUM (RIBITOL)

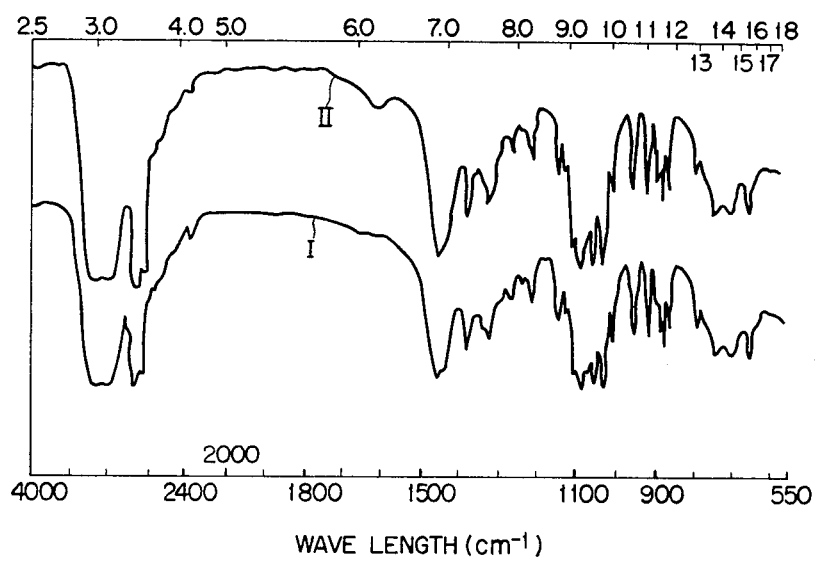
FIG. 3  INFRARED ABSORPTION SPECTRUM (L-ARABITOL)

METHOD FOR THE PREPARATION OF PENTITOL FROM PENTOSE BY USING BACTERIA

This invention relates to a new method for the preparation of pentitol from pentose by using bacteria. In detail, this invention relates to a method for the preparation of pentitol by cultivating a strain of Corynebacterium, No. 208, which is found in the natural world, and the variation of said strain or strains belonging to Corynebacterium on a culture medium comprising a carbon source such as gluconic acid and others, a nitrogen source, inorganic salts and thiamine or a thiamine-containing source under aeration, adding pentose to said culture medium at a desired point of time during cultivation for accumulating pentitol in the culture medium and separating said pentitol from the culture medium.

In accordance with this invention, the pentose such as D-xylose, D-ribose or L-arabinose is added to the culture medium and cultivation is carried out for producing xylitol, ribitol or L-arabitol respectively.

Among pentitols, xylitol was considerably investigated relative to its physiological actions and its applications and it was recently watched with very great interest. Xylitol is known as a normal metabolic intermediate for a uronic acid cycle which is one of the metabolic pathways of sugar produced in a living body and therefore xylitol displays an important function of sugar catabolism and has an excellent physiological property. For example, it is known that xylitol is absorbed into cells without the necessity of using insulin and also it is assimilated as it is into the tissue of the living body without suffering phosphorylation and therefore it can be used with high efficiency. Also, it has been proved that xylitol can be used without increasing the value of blood sugar and that it is strong against the action of ketone. Due to such properties of xylitol, it is used in medical treatment of a patient suffering from diabetes and also it is widely used as a sugar transfusion liquor when a surgical operation is conducted. Further xylitol has proved to have a medical effect for curing the jaundice of a body. Still further, xylitol can be used as a sweetening material for a diabetes patient as it can be used with foodstuffs to be seasoned for a sweet taste. It is therefore apparent that xylitol will receive wide application in the future.

Ribitol and arabitol have not so far been widely reported concerning their utility but it is expected to develop further.

Heretofore, xylitol has been prepared from xylose as the raw material by hydrogenating it with hydrogen in the presence of a reducing catalyst under high pressure. Contrary to the xylitol synthesized by the chemical reaction, there was reported by Onishi and Suzuki in Agr. Biol. Chem., Vol. 30, P. 1,139, (1966) that pentitol could be produced by using microorganisms, for example, yeasts such as Candida, Pichia, Hansenula, Torulopsis or Monilia. Other reports bout the production and the metabolism of and fungi pentitol were directed to the use of yeasts, molds and fungi imperfecti. It should be noted that this invention relates to a method for the preparation of pentitol from pentose by using bacteria belonging to Corynebacterium which differs bacteriologically from yeasts, molds and fungi imperfecti. Also it should noted that this invention has advantageous merits in comparison with the chemical method for producing xylitol by hydrogenating xylose under high pressure since this invention does not require a hydrogenating catalyst and high pressure, but it can be carried out under a moderate condition by using a simple apparatus.

The strain of Corynebacterium No. 208 were isolated by the inventors from soil and their bacteriological properties were disclosed in Japanese Pat. Publication No. 24468 issued in the year 1968. The Corynebacterium No. 208 was deposited as FERM–P No. 128 in "Fermentation Research Institute, Agency of Industrial Science & Technology". The bacteria belonging to Corynebacterium are characterized by the properties requiring thiamine and assimilating gluconic acid for their growth.

The bacteriological characteristics of the bacterium utilized in the process of this invention are as follows:

I. Morphological characteristics

1. Shape: A roundish short rod-like bacillus having a size of 0.7 to 1.0 × 2.0 to 7.0 microns which exists singly or in pairs or aggregation. The shape is varied occasionally into the club, snapping division and branching states.
2. Motility: Non-motile
3. Gram-dyeing: Positive
4. Spore: Not produced
5. Cultivation on a meat juice-containing flat agar-agar at 30° C. for 24 to 48 hours:

| | |
|---|---|
| Growth | Moderate |
| Shape | Circular |
| circumference | Smooth |
| Upheaval | Slight |
| Gloss | Dull |
| Color | Opaque, white or creamy white |

6. cultivation on a meat juice-containing slant agar-agar at 30° C. for 24 to 48 hours:

| | |
|---|---|
| Growth | Moderate |
| Shape | Linear |
| Color | Opaque, white or creamy white |

7. Cultivation on a meat juice-containing stab agar-agar at 30° C. for 24 to 48 hours:

| | |
|---|---|
| Growth on the surface | Good, aerobic |
| Growth of the stab line | Linear |

8. Cultivation on meat juice (or broth) having a pH value of 7.0 at 30° C. for 24 to 48 hours:

| | |
|---|---|
| Surface | Thick film |
| Turbidity | zero |
| Perfume | zero |
| Precipitate | zero |

9. Cultivation on a meat juice-glucose-containing agar-agar:

| | |
|---|---|
| Growth | Same as in case of the cultivation using the meat juice-containing agar-agar |

10. Cultivation on a slant potato nutrient medium:

| | |
|---|---|
| Growth | Good |
| Color | Orangish brown or gray to grayish brown at the deep inner side of the slant potato. |

II. Physiological characteristics

| | |
|---|---|
| 1. Temperature for growth: | 20 to 30°C. |
| 2. Optimum temperature for growth: | 25 to 28°C. |
| 3. pH value for growth: | 5.0 to 9.0 |
| 4. Optimum pH value for growth: | 6.0 to 7.0 |
| 5. Oxygen requirement: | Aerobic |
| 6. Litmus milk: | Weak alkalinity |
| 7. Gelatine: | Not digested |
| 8. Starch: | Not hydrolyzed |
| 9. Indol: | Not produced |
| 10. Hydrogen Sulfide: | Produced |
| 11. Voges-Proshauer reaction: | Negative |
| 12. Methyl red reaction: | Negative |
| 13. Catalase: | Positive |
| 14. Urease: | Negative |
| 15. Acid-resistance: | Zero |
| 16. Reducibility for nitrates: | Weakly positive |
| 17. Milk: | Not coagulated |
| 18. Assimilability of ammonium salts: | Positive |
| 19. Fermentation of Carbohydrates such as arabinose, xylose, glucose, mannose, fructose, galactose, lactose, maltose, saccharose, raffinose, sorbit, inositeglycerol inulin, dextrine, starch, cellulose and trehalose by using the Barsiekow's nutrient medium at 30°C. for 7 days: | Acids and gases not produced. |

A culture medium used for producing and accumulating the pentitol in accordance with this invention contains salts of gluconic acid such as potassium salt, sodium salt and calcium salt of gluconic acid as a carbon source; pentose; ammonium salts such as ammonium sulfate, ammonium chloride, ammonium nitrate and ammonium lactate as a nitrogen source; and inorganic salts such as potassium dihydrogen phosphate and magnesium sulfate. The culture medium is mixed with thiamine or a thiamine-containing source such as a corn steep liquor, a meat extract or a yeast extract. The thiamine or the thiamine-containing source must be added into the culture medium in an amount as required for maximizing the growth of the strain of Corynebacterium in order to accumulate the pentitol. Also, it is possible to accumulate the pentitol in the culture medium with high efficiency by controlling the amount of gluconic acid and pentose such as xylose, ribose or L-arabinose, which are added into the culture medium, and also by adjusting the proportions of the additive materials, the procedures for cultivation and the timing for adding the additive materials to the culture medium. The following procedures for adding pentose to the culture medium can be applied to the method according to this invention.

1. Gluconic acid and pentose are added to a culture medium at the time when the cultivation is started and then the cultivation is carried out.
2. A culture medium containing gluconic acid as a carbon source is inoculated with the strain of bacteria and the bacteria are increased and then pentose is added at once or step by step to the culture medium and the cultivation is contained.

After completing the cultivation, the resultant culture broth is centrifuged or filtered to separate the bacteria from a filtrate. The filtrate is treated for removing protenous substances and evaporated under reduced pressure to form a concentrate. The concentrate is extracted with hot ethanol to form an extract. The extract is treated with a strong basic anion exchange resin which is a styrene-divinylbenzene copolymer, sold for example by Rohm & Haas Co. Under the trade name Amberlite IRA-401 or IRA-400 (a hydroxy type) for separating the residual pentose from the pentitol product. The crude pentitol is purified by crystalliz the pentitol from an ethanol solution of the crude pentitol. The pentitol is analyzed for elemental components and also tested for the melting point and the specific rotation. The test results are given in the following table 1.

TABLE 1

| Pentitol | Properties of pentitol | | | |
|---|---|---|---|---|
| | Melting Point (°C) | | Elements[2] analyzed (%) | D[3] [α] 20 |
| | Observed | Values reported[1] | | |
| Xylitol | 92.5–93 | 92.5–93.5 | C = 39.62 H = 7.88 | — |
| Ribitol | 101–102 | 101–102 | C = 39.52 h = 8.08 | — |
| L-arabitol | 101–102 | 101–102 | C = 39.52 H = 7.73 | −7.61 |

(¹) indicates the melting point reported in Agr. Biol. Chem. Vol. 30, page 1139 by Onishi and Suzuki (1966).
(²) The indicated values are compared with the theoretical values of $C_5H_{12}O_5$ indicating that C is 39.41% and H is 7.89%.
(³) indicates the value measured at the 7.1% concentration of the test sample dissolved in the saturated borax solution.

Also, the pentitol product, which is produced by using the Corynebacterium, No. 208 and xylose, ribose or L-arabinose is tested for an absorption spectrum by using an infrared ray.

FIG. 3 shows an infrared absorption spectrum of L-arabitol produced by the method of this invention.

It is noted that in each of the figures the curve I is the infrared absorption spectrum of the test sample produced in accordance with the method of this invention and the curve II is the infrared absorption spectrum of the standard sample which is manufactured by Tokyo Kasei Kogyo Kabushiki Kaisha and is commercially available in Japan.

Figure 1:
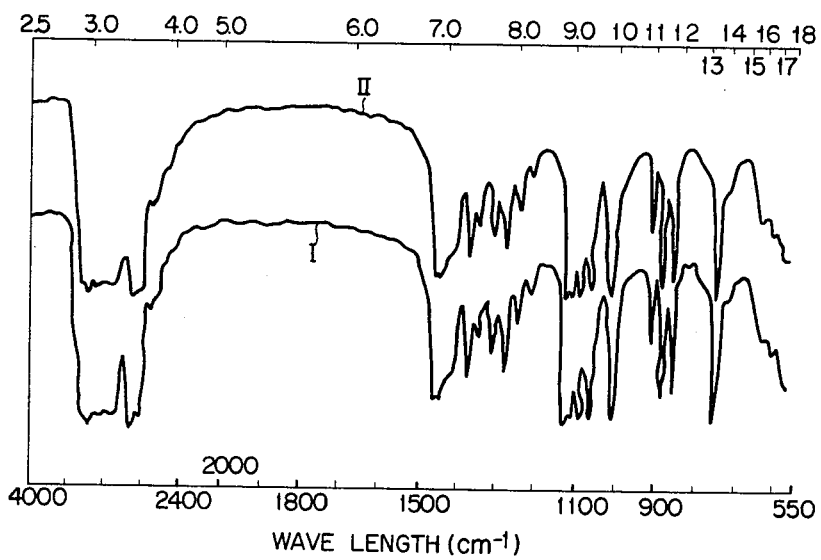
FIG. 1 shows an infrared absorption spectrum of xylitol produced by the method of this invention.
Figure 2:
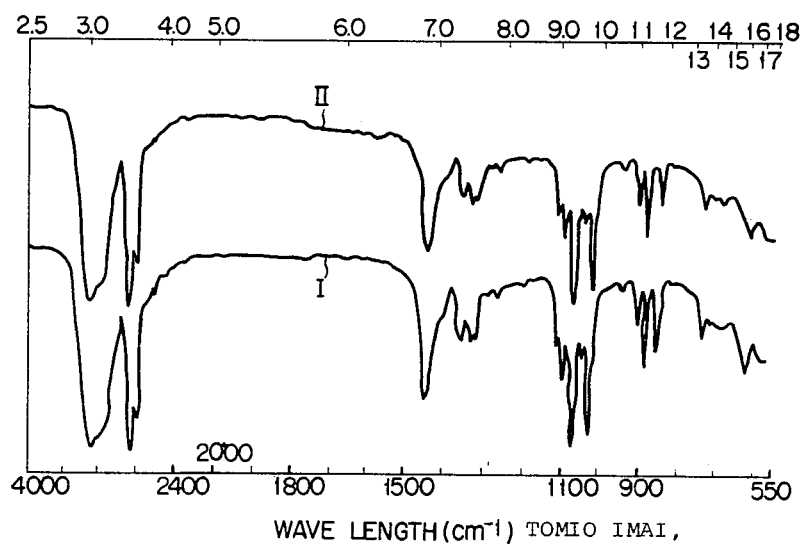
FIG. 2 shows an infrared absorption spectrum of ribitol produced by the method of this invention.

It is recognized from the data as shown in Table 1 and the curves as indicated in FIGS. 1 to 3 that the pentitol product obtained by using the Corynebacterium No. 208 and xylose, ribose or L-arabinose is a true xylitol, ribitol or L-arabitol respectively.

This invention is illustrated by the following Examples. Although the examples are the preferred embodiments for carrying out this invention using the Corynebacterium No. 208, it is obvious to those skilled in the art that this invention can be modified by using a morphological and physiological variety of the Corynebacterium No. 208, variation of the strains derived from such variety of the Corynebacterium No. 208 and the strains of bacteria belonging to Corynebacterium characterized by their properties requiring thiamine and assimilating gluconic acid for their growth. It is therefore understood that this invention includes such modifications as far as this invention is concerned with the use of the bacteria for producing and accumulating pentitol in a culture medium containing thiamine and gluconic acid. In general, it is also understood that the Corynebacterium No. 208 has the ability for converting pentoses into pentitols as the examples show that three pentoses are converted into the corresponding pentitols without change in the components contained in the culture medium or the cultivation conditions.

Example 1

Each of a plurality of 500 ml Erlenmeyer flasks was charged with a 100 ml culture medium comprising 4.8 percent of potassium gluconate, 4 percent of L-arabinose, 0.6 percent of ammonium sulfate, 0.1 percent of potassium dihydrogen phosphate, 0.05 percent of magnesium sulfate and 0.3 percent of corn steep liquor, and the culture medium was adjusted to a pH value varying from 6.5 to 7.0. Each of the adjusted culture media was sterilized and the sterilized culture medium was incubated with a certain amount of a suspension liquor containing bacteria which are grown by cultivating a strain of Corynebacterium, No. 208 on a Bouillon-agar slant medium for 48 hours. The bacteria were cultivated at 30° C. for 12 days by shaking the sterilized culture medium. Then, L-arabitol contained in the culture medium was measured by using paper chromatography and also the method reported by West and Rapoport, and it was found that the culture medium contains 10.0 milligrams of L-arabitol per milliliter of the culture medium. Thus, the resultant culture broth contained in all the flasks was collected to produce a 1,000 ml culture broth and it was centrifuged for removing the bacteria from a supernatant solution. The supernatant solution was treated with zinc sulfate for removing protein substances and then neutralized by adding sodium hydroxide thereto and the neutralized supernatant solution was centrifuged for obtaining a supernatant solution. The supernatant solution was evaporated ans concentrated under reduced pressure until water was substantially removed. The resultant concentrate was treated with hot ethanol to produce an ethanol extract. A crude L-arabitol was fractionated from the ethanol extract by treating it with an anion exchange resin which is a styrene-divinylbenzene copolymer and is referred to as Amberlite IRA-400 (a hydroxyl type, OH⁻). The crude L-arabitol was dissolved in ethanol and crystallized from the ethanol solution. 5.1 grams of crystallized L-arabitol were obtained.

EXAMPLE 2

Each of a plurality of 500 ml Erlenmeyer flasks was charged with a 100 ml culture medium comprising 2.4 percent of potassium gluconate, 4 percent of D-ribose, 0.6 percent of ammonium sulfate, 0.1 percent of potassium dihydrogen phosphate, 0.05 percent of magnesium sulfate and 0.3 percent of corn steep liquor, and the culture medium was adjusted to a pH value of 6.5. Each of the adjusted culture media was sterilized and the sterilized culture medium was inoculated with a strain of Corynebacterium, No. 208 at 30° C. for 9 days by shaking the culture medium. It was found that the culture medium contains 9.2 milligrams of ribitol per milliliter of the culture medium. The resultant culture broth contained in all the flasks was collected for obtaining a 1,000 ml culture broth and it was treated in the same manner as in Example 1 and 4.6 grams of crystallized ribitol were obtained.

EXAMPLE 3

Each of a plurality of 500 ml Erlenmeyer flasks was charged with a 100 ml culture medium comprising 2.4 percent of potassium gluconate, 7 percent of D-xylose, 0.6 percent of ammonium sulfate, 0.1 percent of potassium dihydrogen phosphate, 0.05 percent of magnesium sulfate and 0.3 percent of corn steep liquor, and the culture medium was adjusted to a pH value of 6.5. 100 ml of of the adjusted culture medium were sterilized and the sterilized culture medium was inoculated with a strain of Corynebacterium, No. 208 at 30° C. for 14 days by shaking the culture medium. It was found that the culture medium contains 28.4 milligrams of xylitol per milliliter of the culture medium. The resultant culture broth contained in all the flasks was collected for obtaining a 100 ml culture broth and it was treated in the same manner as in Example 1 and 15.8 grams of crystallized xylitol were obtained.

Example 4

7.2 grams of potassium gluconate, 0.6 gram of ammonium sulfate, 0.1 gram of potassium dihydrogen phosphate, 0.05 gram of magnesium sulfate and 0.3 gram of corn steep liquor were dissolved into 80 ml of water in a 500 ml Erlenmeyer flask and then the resultant culture medium was adjusted to a pH of 6.5. The adjusted culture medium was sterilized and then it was inoculated with a strain of Corynebacterium, No. 208. After the cultivation was carried out at 30° C. for 2 days with shaking, 20 grams of D-xylose were added to the culture medium and the volume of the culture adjusted to 100 ml and then the cultivation was continued for 14 days. It was found that the culture medium contained 75.5 milligrams for xylitol per milliliter of the culture medium. Example 5

7.2 grams of potassium gluconate, 0.6 gram of ammonium sulfate, 0.1 gram of potassium dihydrogen phosphate, 0.05 gram of magnesium sulfate and 0.3 gram of corn steep liquor were dissolved into 80 ml of water in a 500 ml Erlenmeyer flask and the resultant culture medium was adjusted to a pH value of 6.5. The adjusted culture medium was sterilized and then it was inoculated with a strain of Corynebacterium, No. 208. After the cultivation was carried out at 30° C. for 2 days with shaking, D-xylose was added to the culture medium over the period of 4 days in an incremental amount of 5 grams per day and the volume of the culture medium was adjusted to 100 ml and then the cultivation was continued for 14 days. It was found that the culture medium contains 53.6 milligrams of xylitol per ml of the culture medium.

What we claim is that:

1. A method of preparing a pentitol compound selected from the group consisting of xylitol, ribitol and arabitol from the corresponding pentose compound selected from the group consisting of xylose, ribose and arabinose, respectively, which comprises cultivating Corynebacterium No. 208 (FERM-P No. 128) on a culture medium containing gluconic acid, its salts or a mixture thereof as a carbon source, a nitrogen source, inorganic salts and thiamine or a thiamine-containing source, adding the pentose to the culture medium during cultivation, accumulating the pentitol compound in the culture medium and recovering the pentitol compound from the culture medium.

2. The method according to claim 1, wherein the gluconic acid salt is a potassium, sodium or calcium salt.

3. The method according to claim 1, wherein the nitrogen source is ammonium sulfate, ammonium chloride, ammonium nitrate or ammonium lactate.

4. The method according to claim 1, wherein the inorganic salt is potassium dihydrogen phosphate or magnesium sulfate.

5. The method according to claim 1, wherein the thiamine-containing source is corn steep liquor, a meat extract or a yeast extract.

6. The method according to claim 1, wherein cultivation is carried out at 30° C. for 9–14 days.

* * * * *